(12) United States Patent
Fowler et al.

(10) Patent No.: US 6,254,121 B1
(45) Date of Patent: *Jul. 3, 2001

(54) CHAMBERED DRIVER SIDE AIR BAG AND MODULE ATTACHMENT METHOD

(75) Inventors: Gerald M. Fowler, Commerce Township, Oakland County; John A. Musiol, Waterford; Paul R. Weber, Binningham; Tony B. Popovski, Macomb; Markell Seitzman, Orchard Lake, all of MI (US)

(73) Assignee: Breed Automotive Technology, Inc., Lakeland, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,034

(22) Filed: Dec. 14, 1998

(51) Int. Cl.[7] .................................................. B60R 21/24
(52) U.S. Cl. ......................... 280/729; 280/736; 280/742; 280/743.1
(58) Field of Search ................................ 280/729, 743.1, 280/743.2, 736, 742

(56) References Cited

U.S. PATENT DOCUMENTS

| | | | |
|---|---|---|---|
| 3,752,501 | * | 8/1973 | Daniel et al. . |
| 5,240,283 | * | 8/1993 | Kishi et al. ............................ 280/729 |
| 5,249,824 | * | 10/1993 | Swann et al. . |
| 5,480,184 | * | 1/1996 | Young .................................. 280/731 |
| 5,529,337 | * | 6/1996 | Takeda et al. . |
| 5,577,765 | * | 11/1996 | Takeda et al. . |
| 5,906,389 | * | 5/1999 | Fischer . |

FOREIGN PATENT DOCUMENTS

| | | | |
|---|---|---|---|
| 1-13244 | * | 5/1989 | (JP) ...................................... 280/729 |
| 1-247242 | * | 10/1989 | (JP) .................................. 280/743.2 |

* cited by examiner

*Primary Examiner*—Eric Culbreth
(74) *Attorney, Agent, or Firm*—Markell Seitzman

(57) ABSTRACT

A multi-chambered driver side air bag (22) including: a toroidal first chamber (22) facing an occupant to be protected; a second chamber (24) located at least partially within the first chamber; an inflator (28) for first inflating one of the first and second chambers or for inflating both first and second chambers relatively simultaneously.

6 Claims, 18 Drawing Sheets

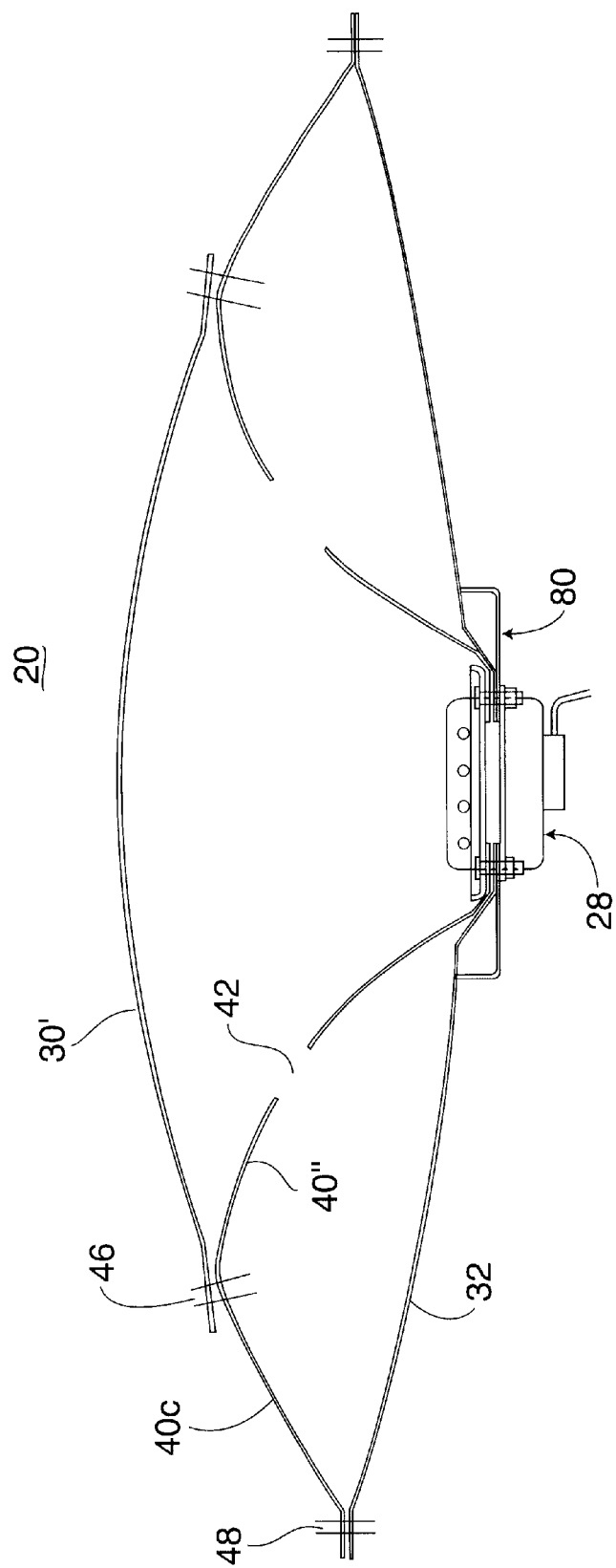

CHAMBERED DRIVER SIDE AIR BAG AND MODULE ATTACHMENT METHOD

BACKGROUND AND SUMMARY OF THE INVENTION

The invention generally relates to air bag systems and more particularly to a multi-chambered driver side air bag.

The typical driver side air bag is manufactured by utilizing two opposing and joined circular front and rear panels of woven material. This material, depending upon the permeability required, may be coated. The two panels define a single chamber that is inflated by an air bag inflator or gas generator. The inflator is received within a central opening of the rear panel. Some driver side air bags include one or more tethers which restrict the distance that the forward facing panel can extend toward the seated driver.

While these prior art air bag constructions provide excellent protection for the normally seated driver, they may not provide optimum protection for the driver seated in an out-of-position (OOP) seated position. For example, an out-of-position occupant is defined as one who is in close proximity to the air bag at the time of deployment.

The present invention reduces OOP forces in two ways. Firstly, the chambering of the air bag provides for more control over the manner of filling the bag, such that it may be filled radially first to control impact to the occupant, or the center can be filled first causing the occupant to be pushed away from the steering wheel rather than inflating under the chin causing neck tension injuries. Secondly, the chambering of the air bag allows for more efficient use of inflation gas which allows for a slower inflator to be utilized. It is well known in the art that a slow inflator fill will reduce the impact of the air bag on the occupant, thereby reducing the forces imparted.

It is an object of the present invention to provide an improved air bag. A further object of the present invention is to provide a multi-chambered air bag. Accordingly the invention comprises: a multi-chambered driver side air bag comprising: a toroidal first chamber facing an occupant to be protected; a second chamber located adjacent the first chamber; inflation means for first inflating one of the first and second chambers or for inflating both chambers relatively simultaneously. In one embodiment the second chamber is located generally within the first chamber. In other embodiments the second chamber is located in front of or behind the first chamber.

Many other objects and purposes of the invention will be clear from the following detailed description of the drawings.

BRIEF DESCRIPTION OF THE DRAWINGS

In the drawings:

FIGS. 15–18 illustrate other embodiments of the invention.

DETAILED DESCRIPTION OF THE DRAWINGS

Figure 1:
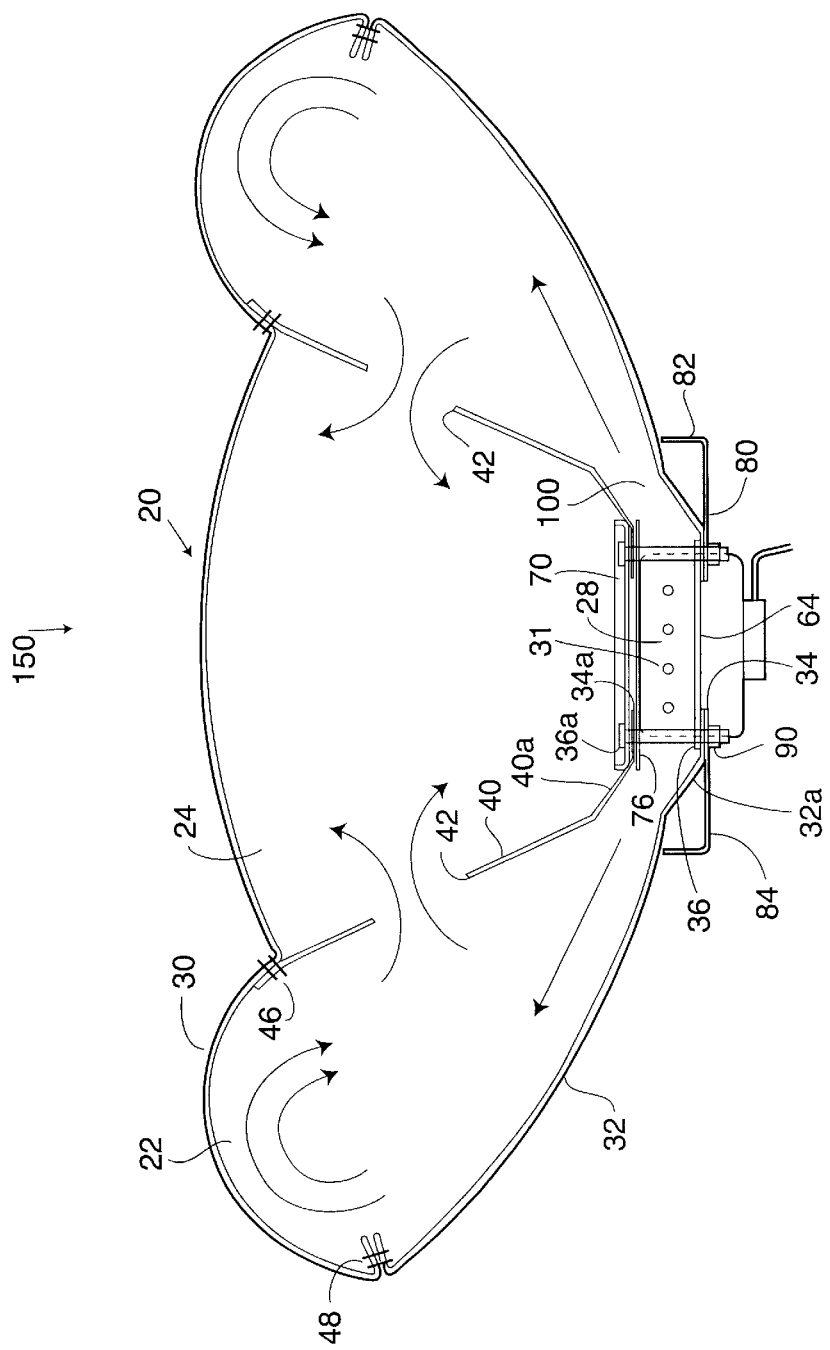
FIG. 1 is a cross-sectional view illustrating the major components of the present invention.

The present invention is directed to a driver side module 150 comprising primarily an air bag 20 having a first chamber 22, a second chamber 24 and inflator 28.

Figure 2:
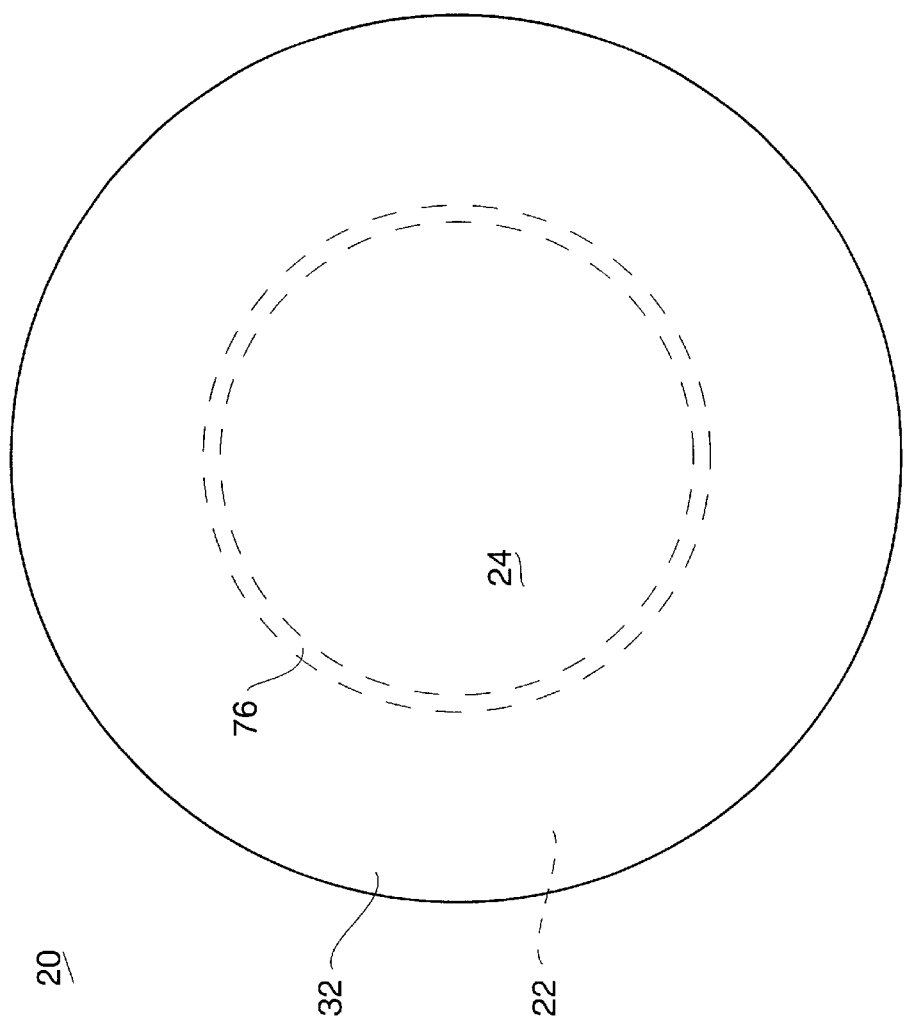
FIG. 2 is a front plan view of an inflated air bag.
Figure 3:
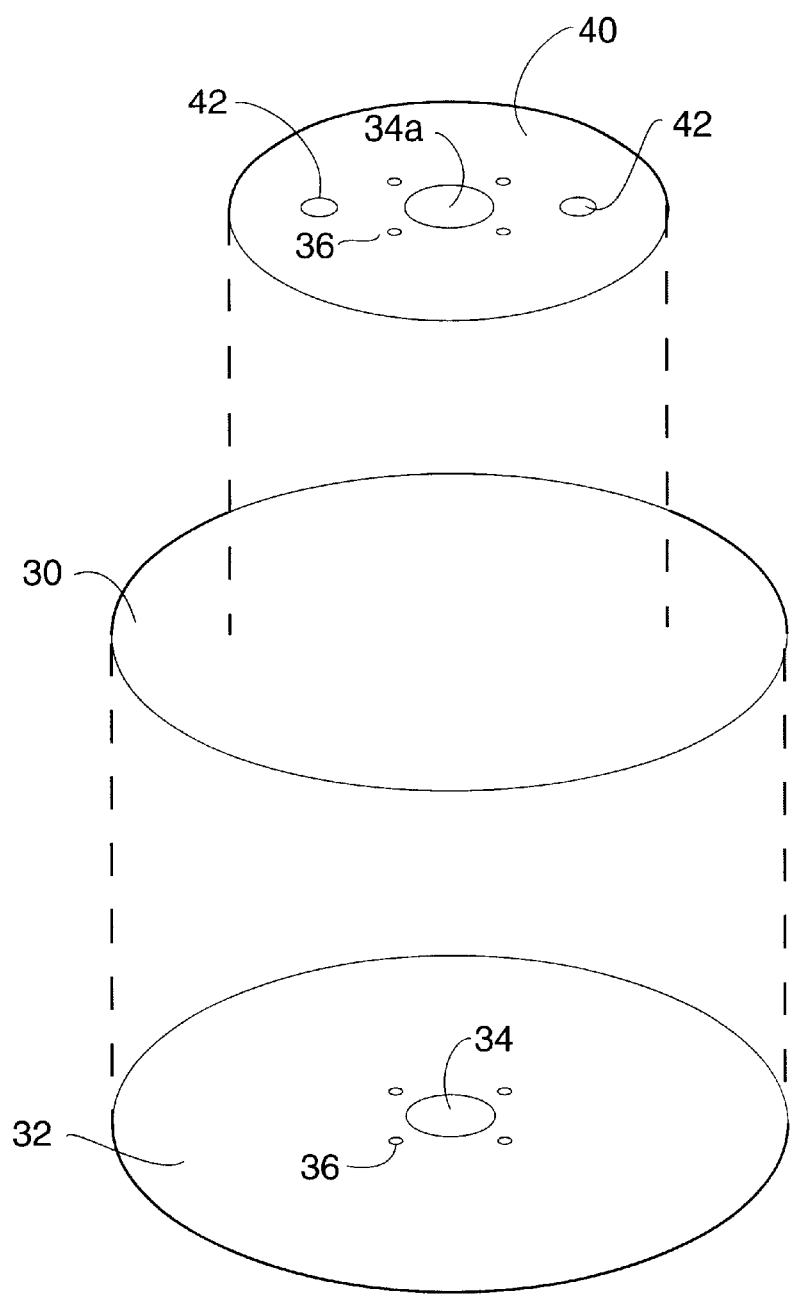
FIG. 3 illustrates an assembly view showing a back or rear panel, face or front panel and chamber separator used in a first embodiment of the invention.

FIGS. 1 and 2 illustrate the major components of the air bag and module. The air bag comprises a generally circular front or face panel 30 and a similarly shaped rear or back panel 32. The rear or back panel 32 includes a central opening 34 and a plurality of fastener holes 36. The inflator 28 is secured within the opening 34 at the neck 32a of the rear panel 32. The air bag 20 additionally includes a third panel of material 40 which functions as a chamber separator. This chamber separator 40 includes an opening 34a, typically of the same size as opening 34, and a like plurality of fastener openings 36a. The number of openings 36a is typically identical to the number of openings 36. In one embodiment of the invention, as illustrated in FIG. 3 and in FIG. 1, the chamber separator 34 includes a plurality of discrete vents or openings 42. In the alternate embodiment of the invention illustrated in FIG. 5 the chamber separator 40 is made of a permeable fabric. The permeability of the panel 40 is equivalent to the area of and replaces the discrete openings 42.

Figure 4:
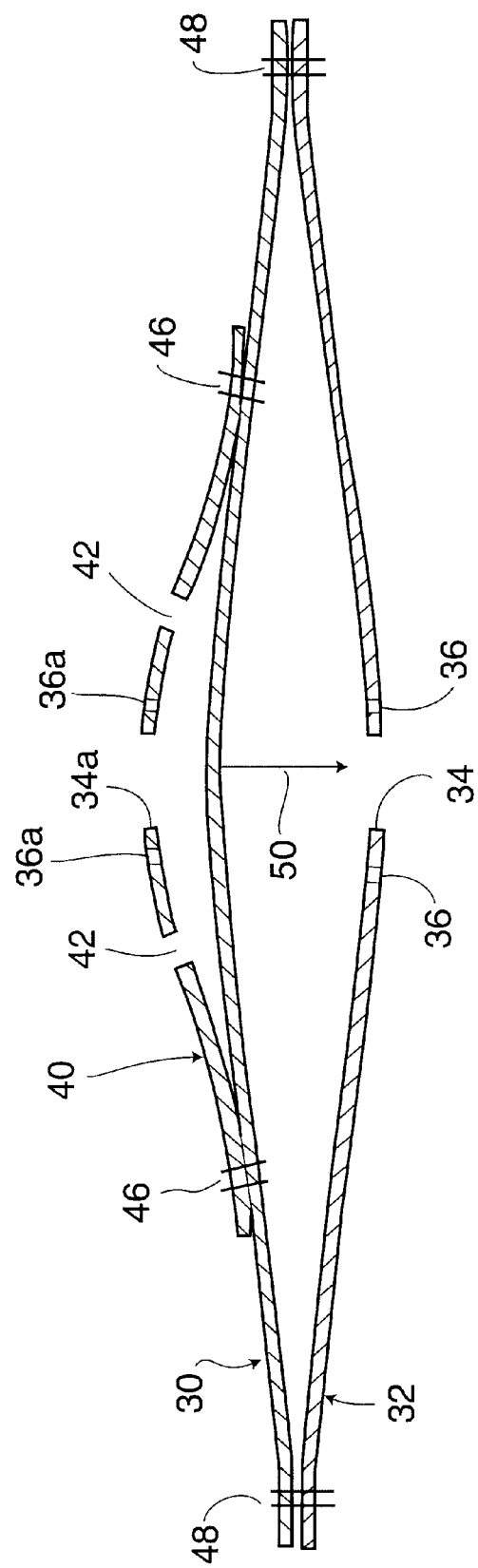
FIG. 4 illustrates a partially constructed air bag.

Reference is briefly made to FIG. 4 which illustrates the steps in the construction of the air bag. The separator panel 40 is laid upon the face panel 30 and subsequently attached thereto, utilizing a peripheral seam of stitches generally shown as 46. Thereafter the face panel (with the chamber separator 40 attached) is registered upon the back panel 32. The face panel and back panel are joined by another peripheral seam of stitches shown as 48.

Figure 6:
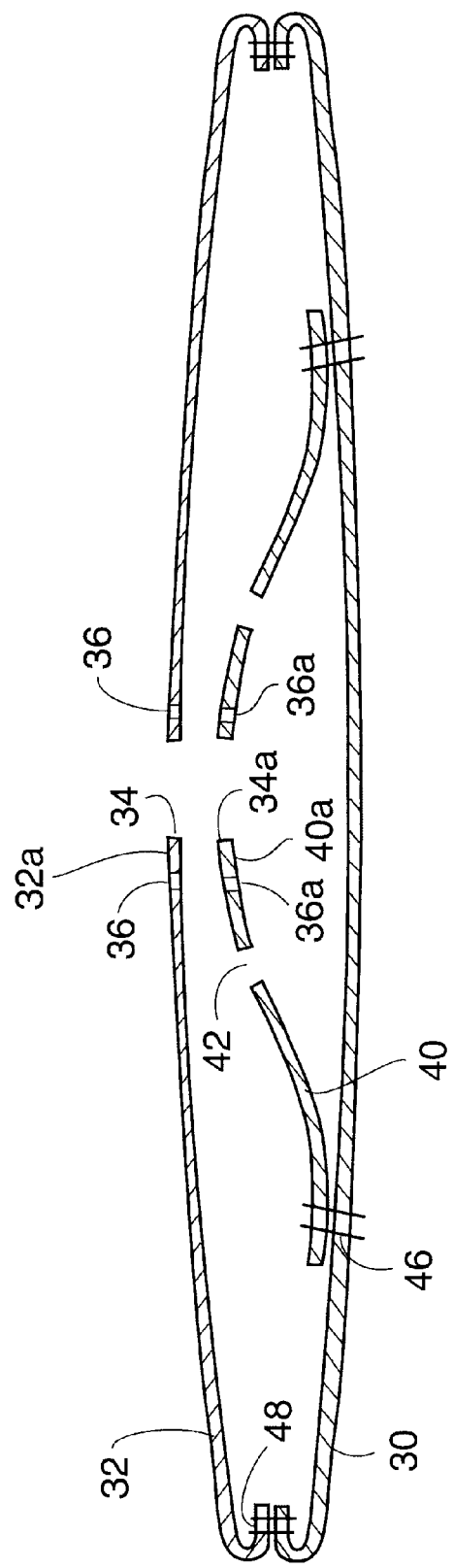
FIG. 6 illustrates an isolated view of a completed air bag.
Figure 7A:
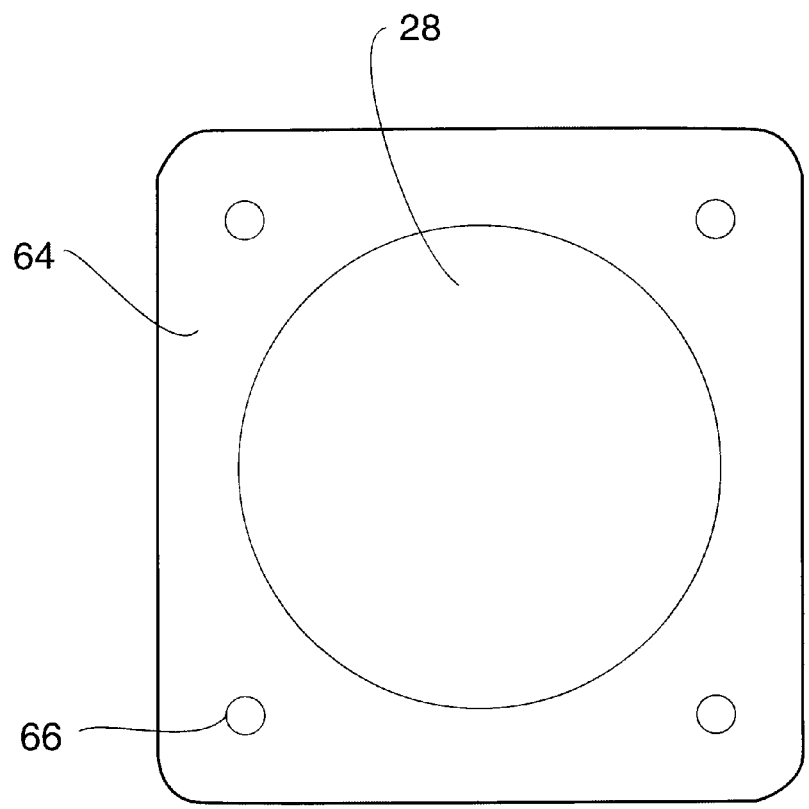
FIG. 7a illustrates a top plan view of the inflator.
Figure 7B:
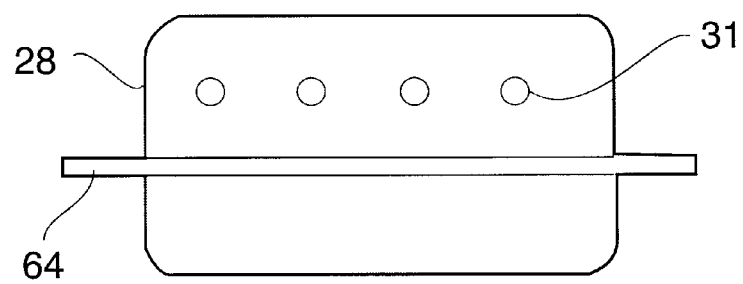
FIG. 7b illustrates a side plan view of the inflator.

The assembled air bag is turned inside out by taking hold of the center of the face panel and separator panel and pulling it through the opening 34 in the back panel. The direction of movement is shown by arrow 50. The resulting construction of the air bag 20 provides that each of the seams 48 and 46 lie inside the air bag as shown in FIG. 6. Subsequently the inflator 28 is secured to the air bag 20.

Figure 5:
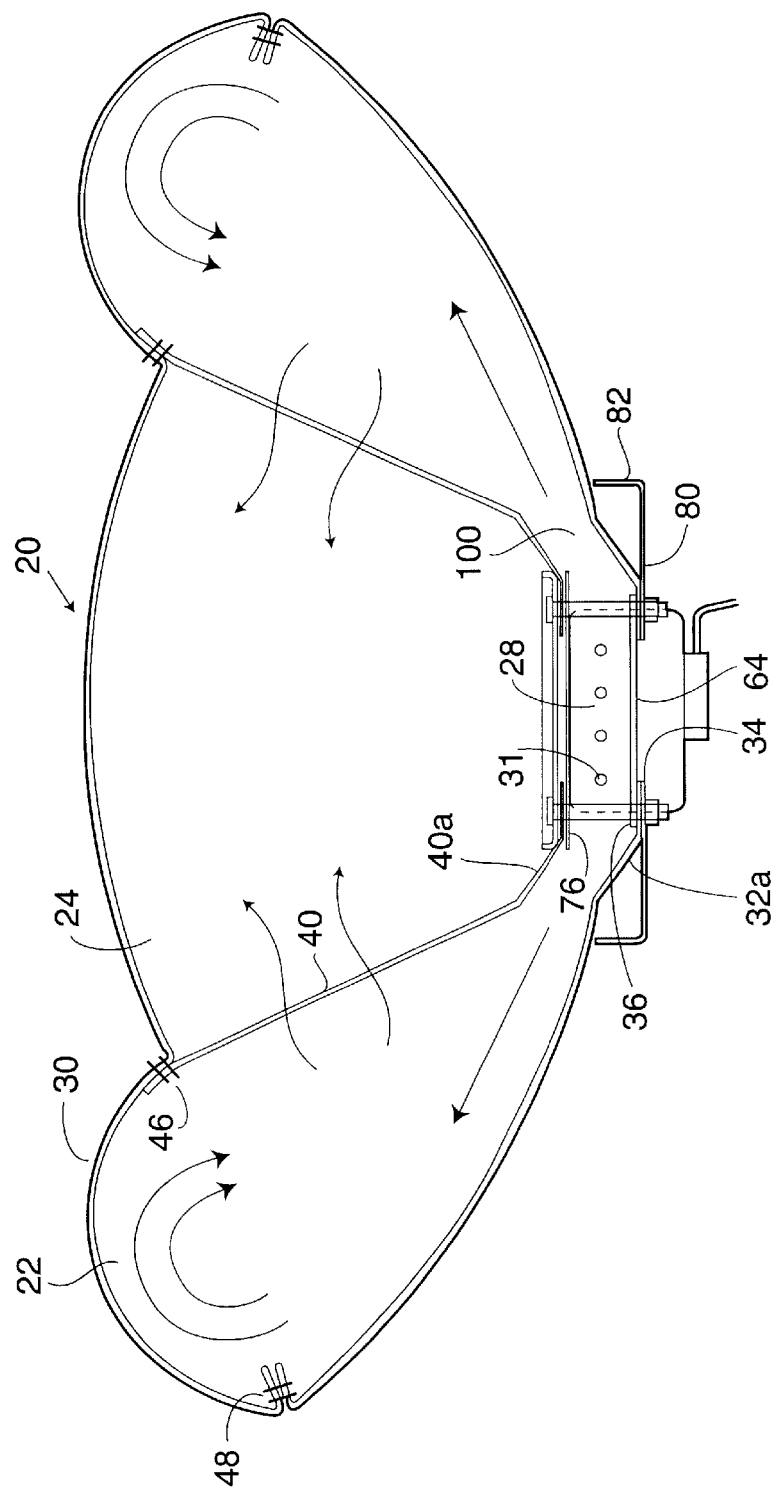
FIG. 5 illustrates an alternate embodiment of the invention.

The following describes the apparatus and method of attaching the inflator 28 to the air bag 20 to affect a multi-chambered air bag 20 of FIGS. 1, 3 and 5. The inflator 28 is of general cylindrical construction and is provided with peripheral flange 64 as more particularly shown in FIGS. 1, 5, 7a and 7b.

Figure 8A:
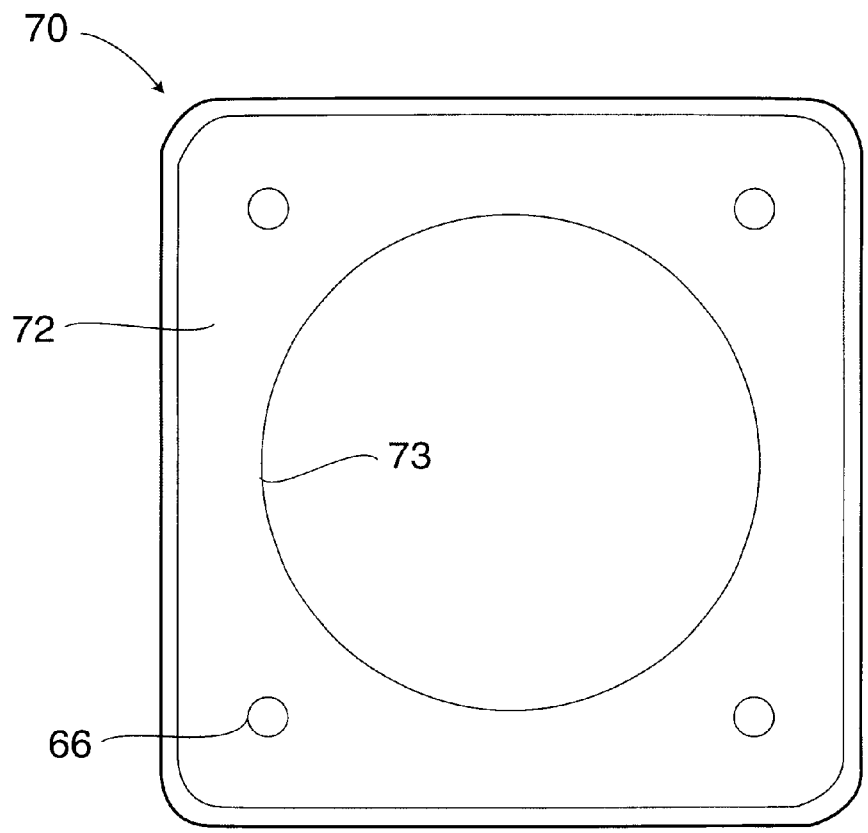
FIGS. 8a and 8b illustrate a top plan and cross-sectional view of a retaining ring.
Figure 8B:
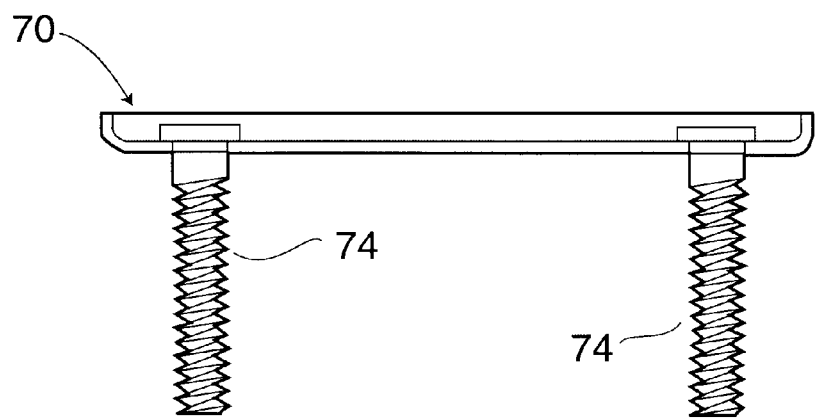
Figure 9:
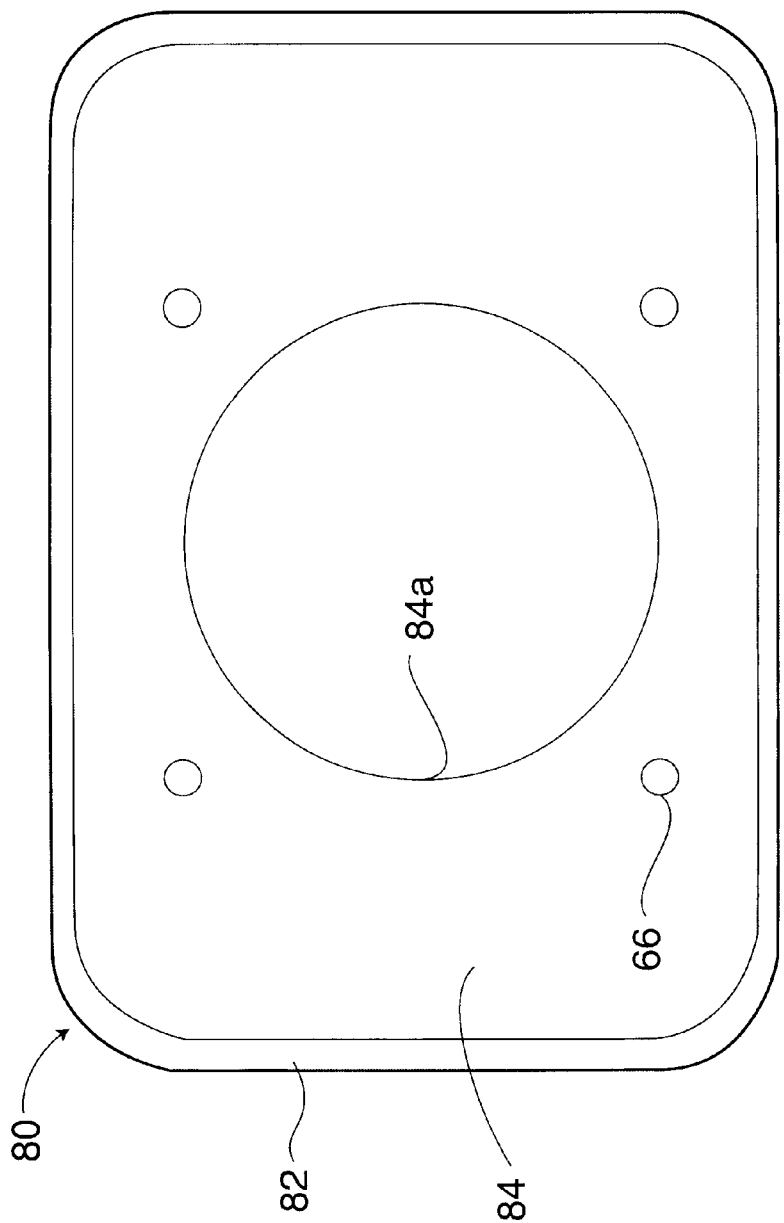
FIG. 9 illustrates a top plan view of a housing.
Figure 10:
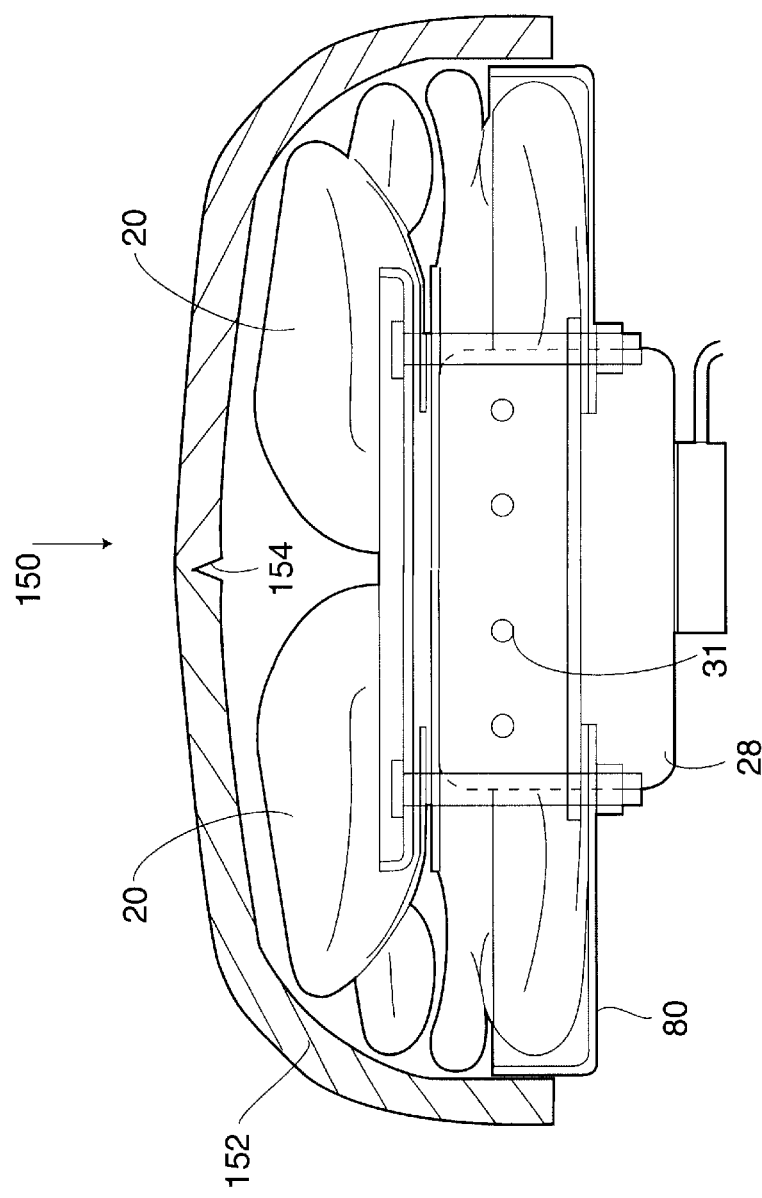
FIG. 10 is a cross-sectional view of a complete module.

Inflator 28 is retained within the air bag 20 by also using a retaining ring 70 and a housing 80. The flange 64 of the inflator 28 includes a plurality of mounting openings 66. The retaining ring 70 (see FIGS. 8a and 8b) includes a plate or body portion 72 having a like plurality of mounting openings 66. The plate or body 72 can be circular, square or rectangular shaped within or without the central opening 73. Secured within each of those openings 66 is a respective threaded fastener 74 which extends from the body 72. The fasteners 74 are not shown in FIG. 8a. A separate plate 76 (see FIGS. 1 and 5) is located below the retaining ring and above the inflator 28 and is used to clamp the neck 40a of the separator panel 40. This plate 76 also has a plurality of mounting openings 66. The housing 80 includes a peripheral rim 82, a body 84 which includes an inflator receiving opening 84a and a plurality of mounting openings 66 (see FIG. 9). As can be appreciated the upraised rim 82 is optional. Mounting or fastener openings 66 in the housing 80 and in the inflator 28 are in alignment with the plurality of threaded studs or fasteners 74. FIG. 10 shows an assembled air bag module 150.

Reference is briefly made to FIG. 6 which, for the purpose of illustration, shows the chamber separator 40 spaced from the back panel 32. During assembly the retaining ring 70 can be inserted through the opening 34 in the back panel and manipulated through the opening 34a in the chamber separator. Thereafter the studs 74 are located within the openings 36a of the chamber separator 40. The mounting ring can also be inserted into the openings on the chamber separator even before it is secured to the face panel. Thereafter the plate 76 is secured to the fasteners sandwiching the neck 40a therebetween. Subsequently, the inflator 30 is slid through the opening 34 in the back panel. The openings 36 in the back panel are fitted about a respective one of the fasteners 74 such that the adjacent material of the back panel lies upon the flange 64 of the inflator. Thereafter the housing 80 is secured onto the fasteners 74 thereby clamping the back panel between the flange 64 and the plate 84 of the housing. The retaining ring 70, inflator 28 and housing 80 are secured together by use of threaded nuts such as 90 (see FIG. 1).

As can be seen from the various figures, the inflator 28 includes one or more exit ports 31. In the embodiment of FIG. 1, these ports 31 are positioned between the back panel 32 and the separator panel 40 such that upon inflation, inflation gas can exit the inflator 28 generally into an annular volume 100 surrounding the inflator. The inflation gas thereafter flows into the first chamber 22 filling same and then into the interior or central chamber 24 through the discrete vents or openings 42 in the separator panel 40. In the alternate embodiment as illustrated in FIG. 5, the inflation gas flows through the permeable separator panel 40 into the center chamber 42 filling same.

As can be appreciated, the length of the separator panel from the points of attachment proximate the inflator to its attachment to the front panel 30 is relatively short and limits the forward extension (toward the driver) of the air bag and as such functions as a tether.

Figure 11:
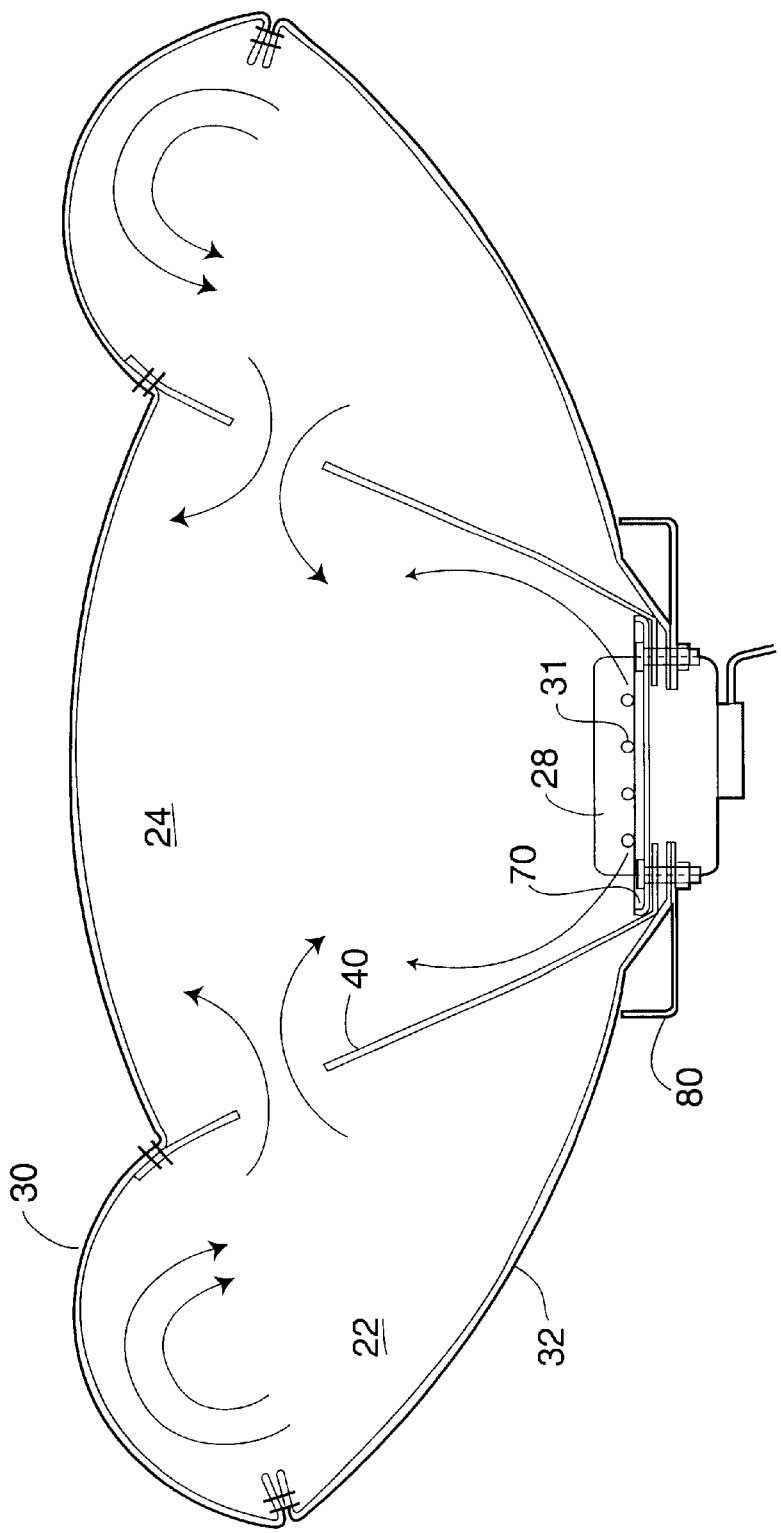
FIG. 11 illustrates an alternate embodiment of the invention.

In the embodiment illustrated in FIG. 11 the upper plate 76 on the inflator is removed and the retainer 70 and housing 80 directly clamp the central portion or neck 40a of the separator panel 40 to the central portion or neck 32a of the back panel 32. Further, as can be seen in this embodiment, the inflator ports are directly communicated to the center chamber 24. Upon activation of the inflator, the inflation gas first fills the center portion and then flows through the ports 42, or alternatively, through permeable material, of the chamber separator 40, into and inflates the peripheral inflation chamber.

Figure 12:
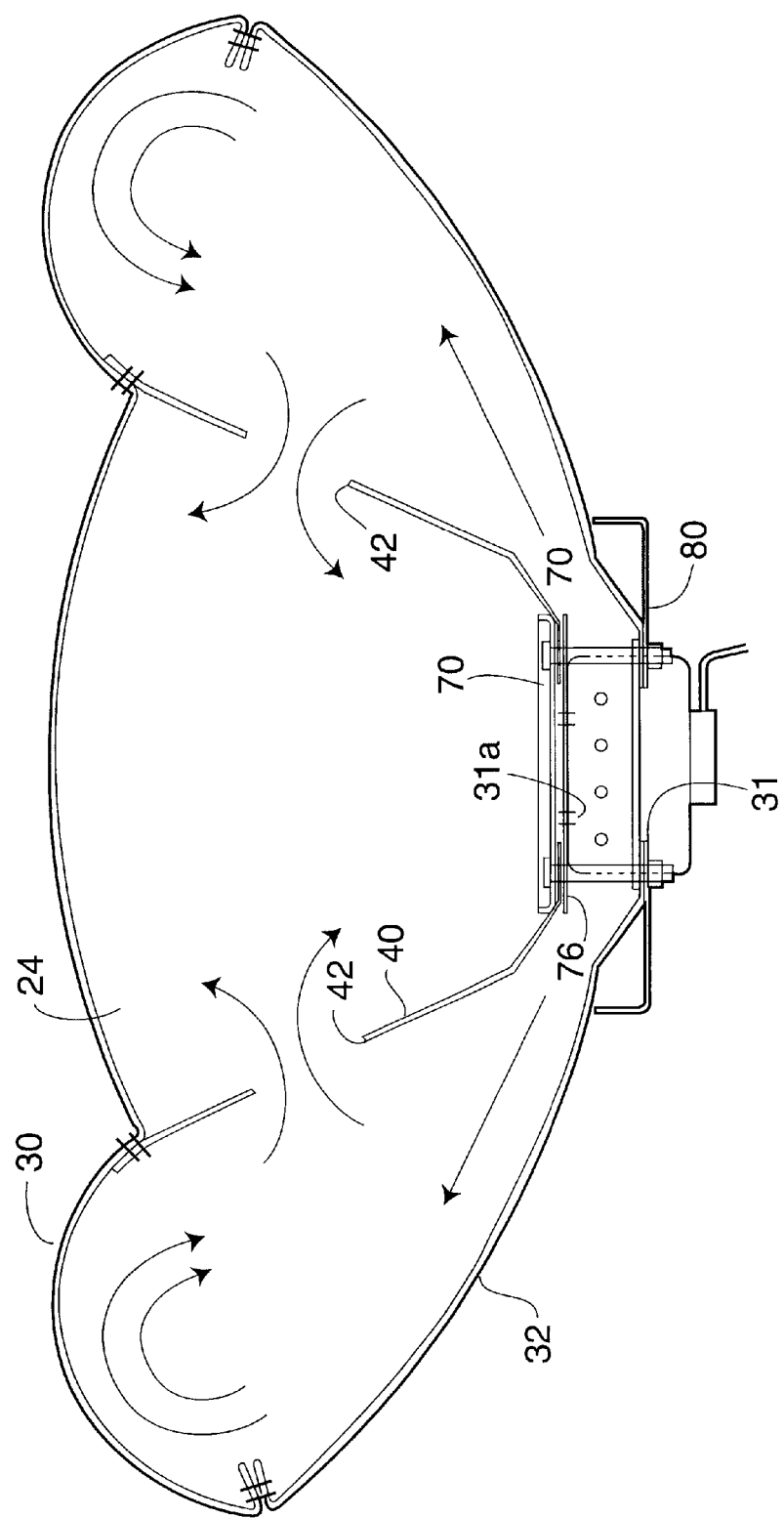
FIG. 12 shows a further embodiment of the invention.

FIG. 12 shows a further alternative of the invention which is similar to FIGS. 1 and 5. In this embodiment some of the inflation ports 31 are communicated to the first chamber 22 and additional ports 31a are communicated to the second chamber 24. In this manner the rate of inflation of each chamber can be controlled directly in proportion to the number and size of the ports 31. The separator panel in this embodiment can be devoid of openings or of a very low permeability, or use discrete vent openings or permeable material.

Reference is again briefly made to FIG. 10 which illustrates an assembled air bag module 150. In this view, the air bag 20 is folded within the housing 80 and protected by a cover 152. Upon deployment of the air bag, the cover 152 is moved away from the housing or caused to separate along frangible tear seams 154, as is known in the art.

Figure 13:
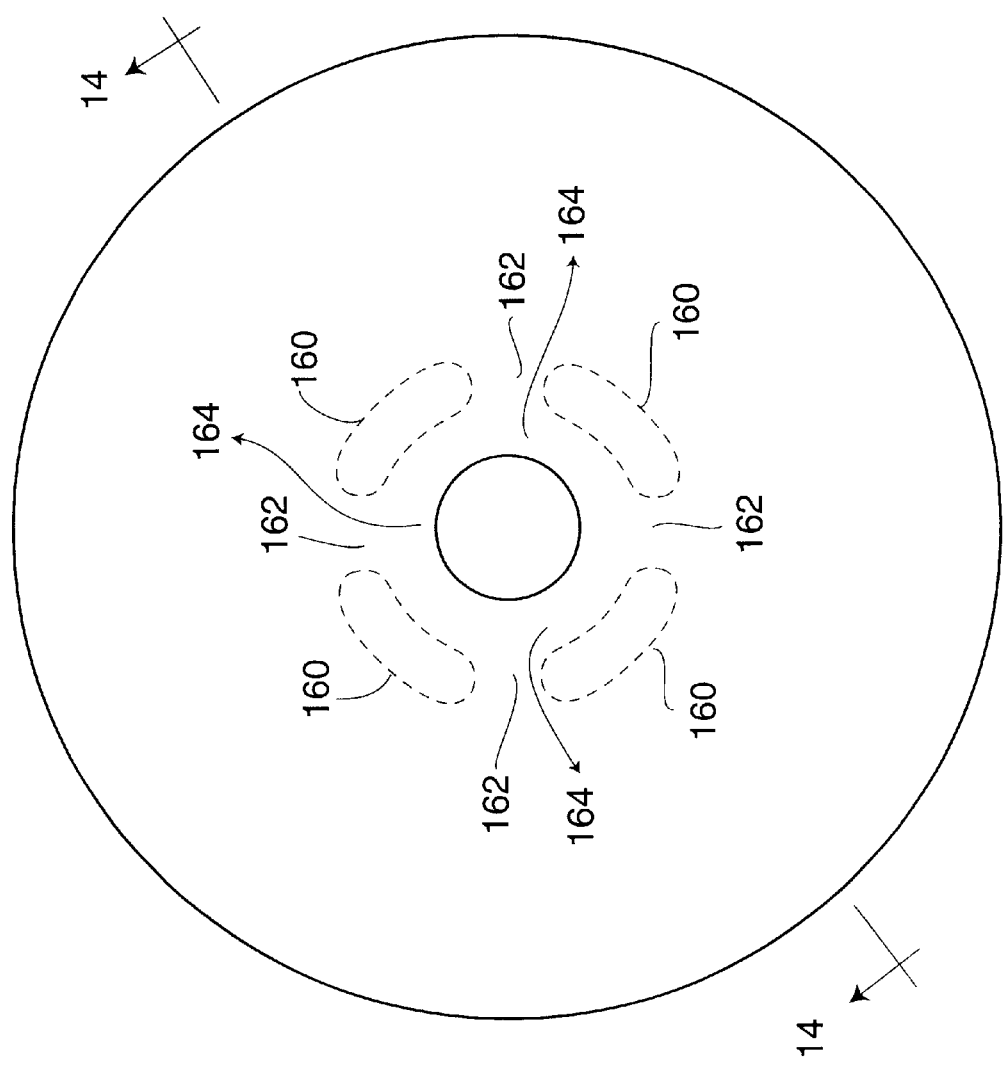
FIGS. 13 and 14 show a further embodiment of the invention.
Figure 14:
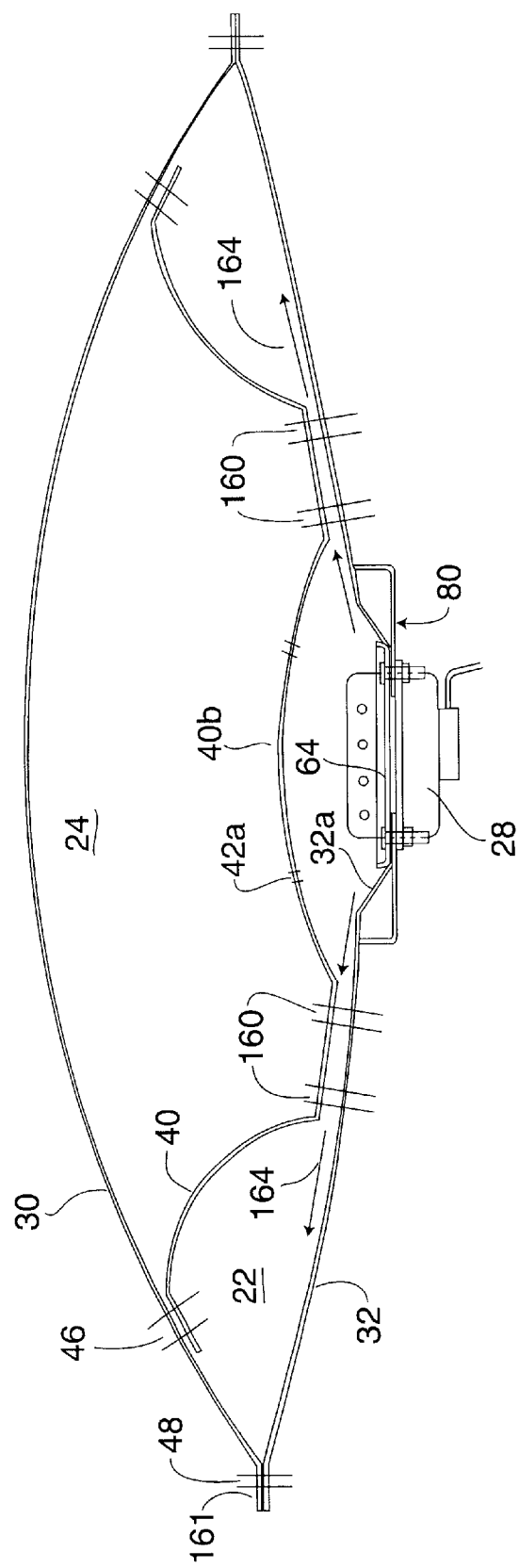

FIGS. 13 and 14 illustrate an alternate embodiment of the invention. In this and the following embodiments some edges 161 of the front and rear panels near the seams 48 are exposed. In the embodiment of FIGS. 13 and 14, the chamber separator panel 40 is first sewn to the rear panel 32 at discrete locations 160. The locations 160 are sewn-together regions or areas. The construction provides flow spaces 162 between adjacent sewn regions 160 (also see the cross-sectional view in FIG. 13) to permit inflation gas (see arrows 164) exiting the inflator 28 to flow between the separator panel 40 and rear panel 32. Subsequently, the separator panel 40 is joined to the face panel 30 at the peripheral seam 46. Having attached the separator panel to the front panel, the edges of the front and rear panels 30 and 32 respectively are joined at a peripheral seam 48. Upon activation of the inflator 28, inflation gas flows through the spaces 162 into the first chamber 22. Thereafter the inflation gas can flow through discrete openings 42 such as illustrated in FIG. 1 or permeable material as illustrated in FIG. 5. Similarly, the inflator 28 can also port inflation gas directly into the center chamber 24. To achieve gas flow into the chamber 24, the center portion 40b of the separator panel 40 will include flow openings such as 42a or alternately the panel 40 will be made using a permeable material. In FIG. 13, the neck portion 32a of the panel 32 is sandwiched between the flange 64 (shown with an up-turned edge) of the inflator 28 and housing 80 or by another method of securement such as using a standard bag ring (a plate with a large center opening for the inflator and a plurality of mounting openings).

Figure 15:
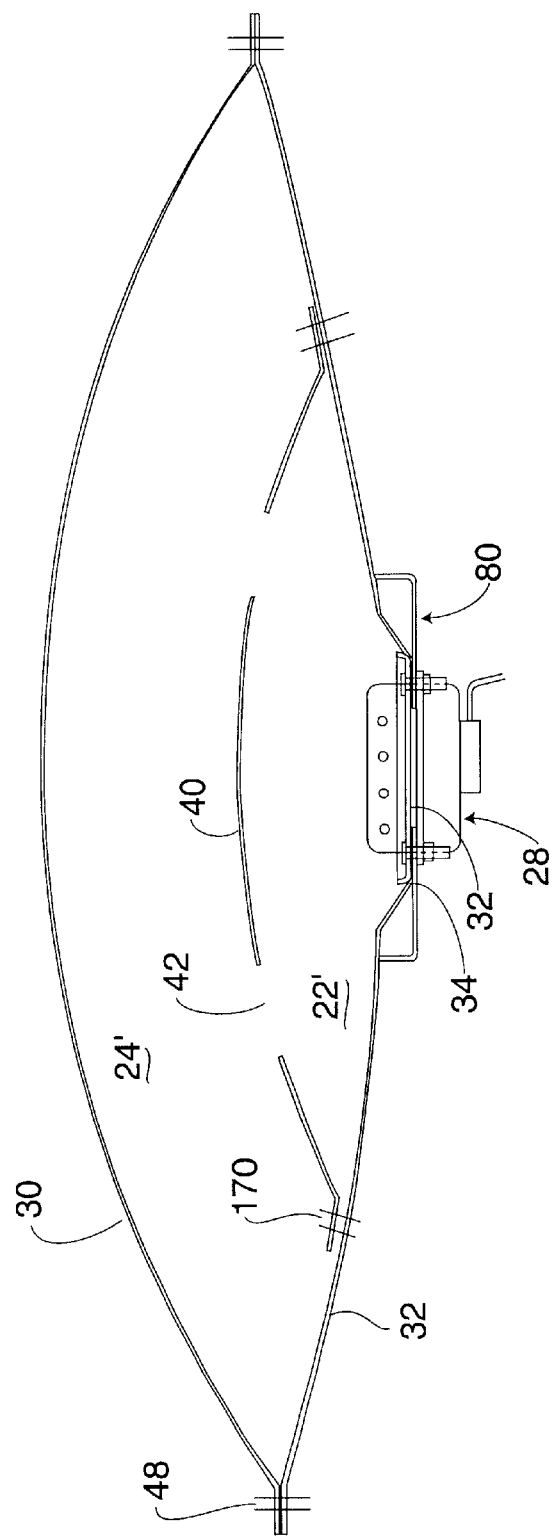

In the embodiment of FIG. 15, the separator panel 40 comprises a generally circular panel secured at an interior seam 170 to the rear panel 32. The panel 32 includes an opening 34 for receipt of the inflator 28. The connection between the rear panel 32, the inflator 28 and housing is diagrammatically illustrated in FIG. 15. Subsequently, the face panel 30 is secured by an exposed peripheral seam 48 to the rear panel 32. Upon activation of the inflator 28, gas flows directly between the face panel and rear panel defining a first inflated chamber 22'. AS can be appreciated, those embodiments using an exposed seam are generally simpler to manufacture. Subsequently, inflation gas flows through the openings 42, or alternatively, the panel 40 is made of permeable material to inflate a second chamber 24'. As illustrated in FIG. 15, the second chamber 24' hides the first chamber 22' from the occupant.

Figure 16:
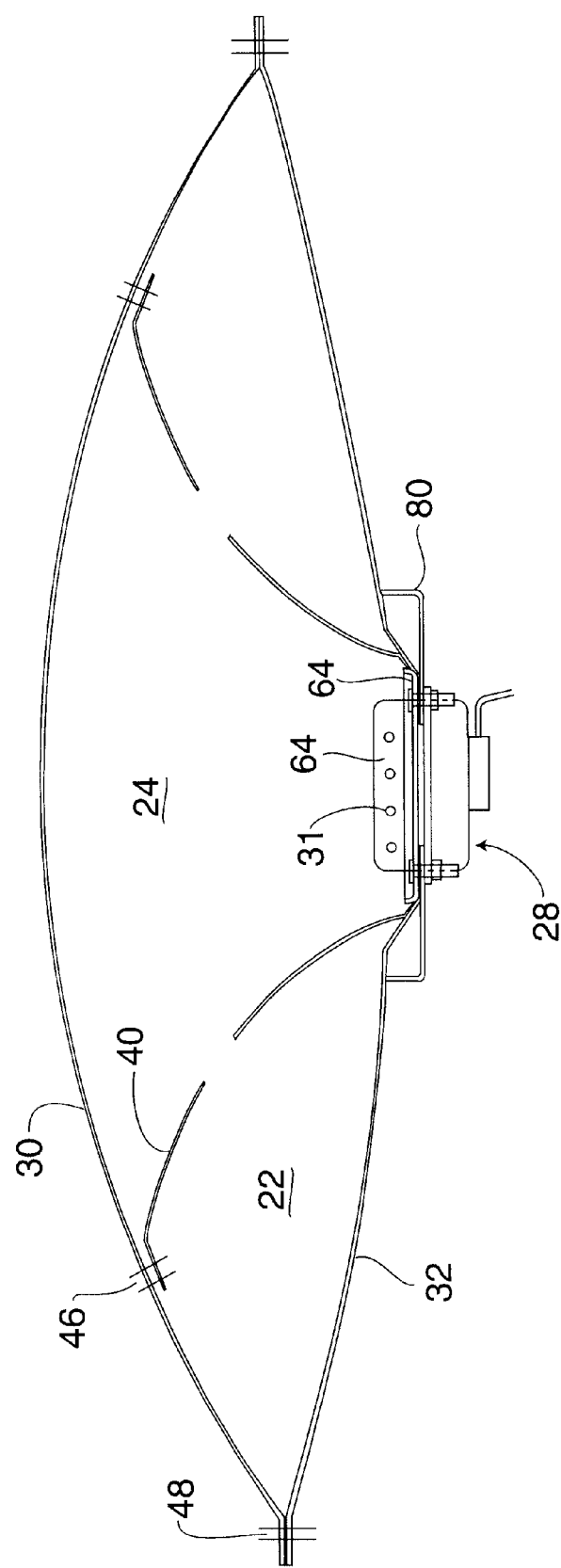

In FIG. 16 the face panel 30 and rear panel 32 are secured proximate their respective neck openings to the inflator 28 and housing 80. The outer edges of the separator panel 40 are secured to the face panel 30 at seam 46 and the rear and face panel 32 and 30 are joined at seam 48. Upon activation of the inflator, inflation gas flows into the first chamber 24 defined between the rear panel 30 and face panel 40 and through orifices 42 (or permeable material) into the outer chamber 22.

Figure 17:
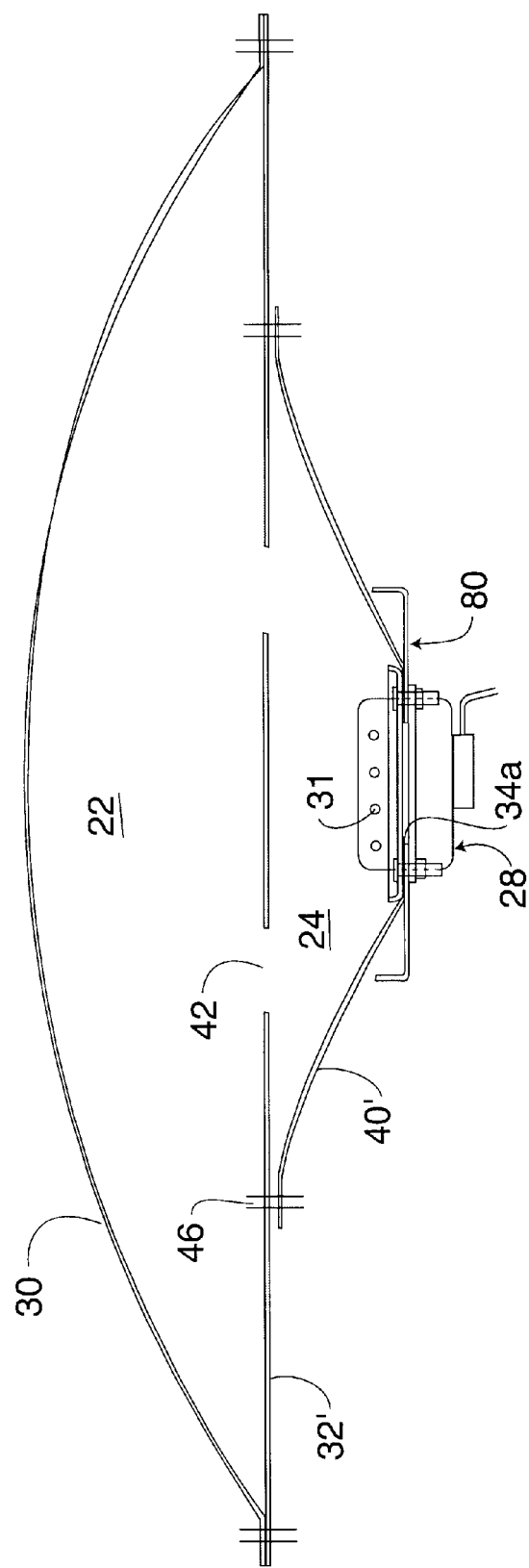

Reference is briefly made to FIG. 17 which comprises a face panel 30 and an intermediate panel 32' (which is generally identical to the rear panel 32 of the earlier embodiments). However, in this embodiment panel 32' includes the discrete orifices 42. A smaller panel such as 40' is secured by a seam 46 to the panel 32'. It is this panel 40' that includes an opening 34 to receive the inflator 28. Chamber 22 is located behind chamber 24.

FIG. 18 shows still another embodiment of the invention in which an enlarged separator panel 40" is secured to the edge of the rear panel 32 at seam 48. The respective necks of the panels 40" and 32 are secured to the inflator and housing. In this embodiment, the face of the air bag 20 is formed by a small diameter face panel 30' that is sewn to the separator panel 40". As can be seen the face of the air bag is formed by the face panel 30' and the outer surrounding portions 40c of the separator panel 40". It should also be appreciated that the respective neck portions of the separator panels and rear panels of FIGS. 16 and 18, as well as the inflator and housing, can be configured to achieve the gas flow described in conjunction with FIGS. 1 and 5.

Many changes and modifications in the above-described embodiment of the invention can, of course, be carried out without departing from the scope thereof. Accordingly, that scope is intended to be limited only by the scope of the appended claims.

What is claimed is:

1. A multi-chambered driver side air bag comprising:
    a toroidal first chamber (22) facing an occupant to be protected;
    a second chamber (24) located at least partially within the first chamber;
    inflation means (28) for directly inflating both chambers relatively simultaneously wherein the inflation means includes a first set of radially disposed exit ports for communicating inflation gas to the toroidal first chamber and further includes a second set of axially directed exit ports, generally perpendicular to the radially disposed exit ports, to communicate inflation gas to the second chamber.

2. The device as defined in claim 1 wherein the first and second chambers share a common wall (40).

3. The device as defined in claim 2 wherein the common wall (40) includes flow means (42) for permitting inflation gas to flow between the first and second chambers.

4. The device as defined in claim 3 wherein the flow means includes one of discrete orifice and permeable material.

5. A multi-chambered driver side air bag comprising:
    a toroidal first chamber (22) facing an occupant to be protected;
    a second chamber (24) located at least partially within the first chamber;
    inflation means (28) for directly inflating one of a) the first chamber and b) both chambers relatively simultaneously; wherein the first chamber and second chamber include a respective neck portion (40a, 32a) having a respective opening, the inflation means received within the respective neck portions and the inflation means including clamping means for respectively clamping each neck portion in a spaced apart configuration to allow inflation gas to flow therebetween;
    wherein the clamping means includes one of a flange and a plate which in cooperation with a retaining ring (70) and housing (80) serves to clamp one or more neck portions;
    wherein the retaining ring (70) and the plate or flange of the inflation means (28) clamp a neck portion that is common to both chambers in place.

6. A safety device including a multi-chambered air bag (20) and an inflator, the air bag comprising:
    a first annular chamber (22) in communication with the inflator, the first annular chamber including an inlet into which the inflator is received and
    a second inflatable chamber (24) positioned centrally relative to the first chamber (22) in communication with the first chamber, however, positioned remote from the inflator; wherein upon the filling of the first annular chamber and the second inflatable chamber each chamber extends diametrically relative to a centerline of the device and wherein the inflated diameter of the second inflatable chamber is less than the diameter of the first annular chamber; and
    wherein the inflator directly fills the first annular chamber (22);
    wherein the inflator includes at least one exit port,
    the air bag includes a circular first panel and a circular second panel, each panel having a peripheral edge, the first and second panels joined together at their respective peripheral edges, the first panel including a first opening in a predetermined portion thereof, for receipt of the inflator,
    a third panel, having a peripheral edge secured proximate the edge of the first panel; the third panel having a central portion, the third panel including one of a) flow passages and b) a permeability to permit gas to flow there across; and
    mounting means for positioning the central portion of the third panel spaced apart at a fixed spacing from the predetermined portion of the first panel and for positioning the central portion of the third panel and the predetermined portion about the exit port of the inflator, wherein the third panel defines a separator between the first and second chambers and wherein the fixed spacing between the central portion of the third panel and the predetermined portion of the first panel defines the inlet to the first chamber.

* * * * *